United States Patent
Aoyama et al.

(10) Patent No.: US 10,218,252 B2
(45) Date of Patent: Feb. 26, 2019

(54) LINEAR MOTOR AND POSITIONING APPARATUS

(75) Inventors: Yasuaki Aoyama, Hitachinaka (JP); Yoshitaka Iwaji, Hitachinaka (JP); Kohji Maki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 688 days.

(21) Appl. No.: 13/702,257

(22) PCT Filed: Jun. 9, 2010

(86) PCT No.: PCT/JP2010/003824
§ 371 (c)(1),
(2), (4) Date: Dec. 31, 2012

(87) PCT Pub. No.: WO2011/154995
PCT Pub. Date: Dec. 15, 2011

(65) Prior Publication Data
US 2013/0093264 A1 Apr. 18, 2013

(51) Int. Cl.
*H02K 41/02* (2006.01)
*H02K 41/03* (2006.01)
(Continued)

(52) U.S. Cl.
CPC ............ *H02K 41/031* (2013.01); *H02K 1/06* (2013.01); *H02K 1/278* (2013.01); *H02K 16/00* (2013.01); *H02K 41/02* (2013.01); *H02K 2213/12* (2013.01)

(58) Field of Classification Search
CPC ........ H02K 39/00; H02K 41/02; H02K 41/03; H02K 41/031; H02K 43/033; H02K 1/12; H02K 1/14; H02K 1/146; H02K 2201/12
(Continued)

(56) References Cited

U.S. PATENT DOCUMENTS 4,346,318 A * 8/1982 Shtrikman ............. H02K 33/06
310/12.24
4,868,431 A * 9/1989 Karita et al. ............... 310/12.24
(Continued)

FOREIGN PATENT DOCUMENTS

JP 63087165 A * 4/1988
JP 7-329783 A 12/1995
(Continued)

OTHER PUBLICATIONS

J-Pat-Plat English Machine Translation, Kin et al. JP 2005-287185, Oct. 2005.*
(Continued)

*Primary Examiner* — Burton Mullins
(74) *Attorney, Agent, or Firm* — Crowell & Moring LLP

(57) ABSTRACT

The present invention provides a linear motor where a load onto a supporting mechanism and the ripple of force are lessened and the ripple can be adjusted. As a leakage flux between the magnetic poles can be reduced by being configured by plural magnetic poles arranged with a magnet arranged on a mover held between them, a core that continuously connects the magnetic poles that holds the magnet of the mover between them, windings are integrally wound onto the plural magnetic poles and the mover formed by a row of magnets the magnetic poles of which are alternately arranged or a row of magnets the polarity of which is alternately arranged and magnetic materials, by arranging the plural magnetic poles arranged with the magnet held between and the plural magnetic poles provided with the core that continuously connects the magnetic poles.

13 Claims, 18 Drawing Sheets

(51) Int. Cl.
*H02K 1/06* (2006.01)
*H02K 1/27* (2006.01)
*H02K 16/00* (2006.01)

(58) Field of Classification Search
USPC ........ 310/12.01, 12.04, 12.25, 12.24, 36–37, 310/50, 179, 180, 184–185
See application file for complete search history.

(56) References Cited

U.S. PATENT DOCUMENTS

| | | | | |
|---|---|---|---|---|
| 4,945,268 | A | * | 7/1990 | Nihei ................ H02K 41/03 310/12.02 |
| 6,856,050 | B2 | * | 2/2005 | Flechon ............ B65H 54/2833 242/481.2 |
| 2002/0050804 | A1 | * | 5/2002 | Joong et al. ................. 318/649 |
| 2002/0053834 | A1 | | 5/2002 | Maki et al. |
| 2002/0053835 | A1 | | 5/2002 | Joong et al. |
| 2002/0195984 | A1 | | 12/2002 | Joong et al. |
| 2004/0004405 | A1 | * | 1/2004 | Ausderau ..................... 310/12 |
| 2008/0252150 | A1 | * | 10/2008 | Grundl et al. ................ 310/12 |
| 2009/0302786 | A1 | * | 12/2009 | Kim ................ H02K 41/03 318/135 |
| 2011/0221283 | A1 | * | 9/2011 | Kawakami .......... H02K 41/031 310/12.25 |

FOREIGN PATENT DOCUMENTS

| | | | | | |
|---|---|---|---|---|---|
| JP | 07329783 | A | * | 12/1995 | |
| JP | 10-174418 | A | | 6/1998 | |
| JP | 10174418 | A | * | 6/1998 | |
| JP | 10-327571 | A | | 12/1998 | |
| JP | 10327571 | A | * | 12/1998 | |
| JP | 2002-142437 | A | | 5/2002 | |
| JP | 2002-142438 | A | | 5/2002 | |
| JP | 2002-142439 | A | | 5/2002 | |
| JP | 2002142439 | A | * | 5/2002 | |
| JP | 2002-209371 | A | | 7/2002 | |
| JP | 2002209371 | A | * | 7/2002 | |
| JP | 2005287185 | A | * | 10/2005 | ............ H02K 41/03 |
| JP | 2008-125322 | A | | 5/2008 | |
| WO | WO 2010058500 | A1 | * | 5/2010 | ............ H02K 41/031 |
| WO | WO 2010103575 | A1 | * | 9/2010 | ............ H02K 41/03 |

OTHER PUBLICATIONS

International Search Report with English translation dated Aug. 31, 2010 (four (4) pages).

* cited by examiner

FIG.2
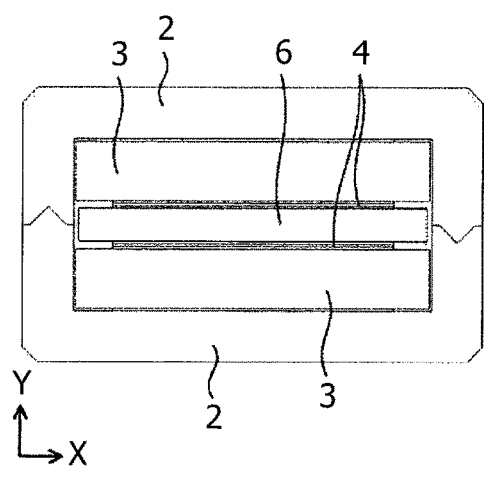
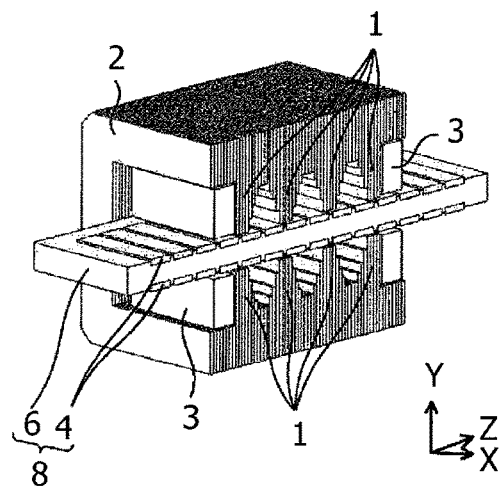
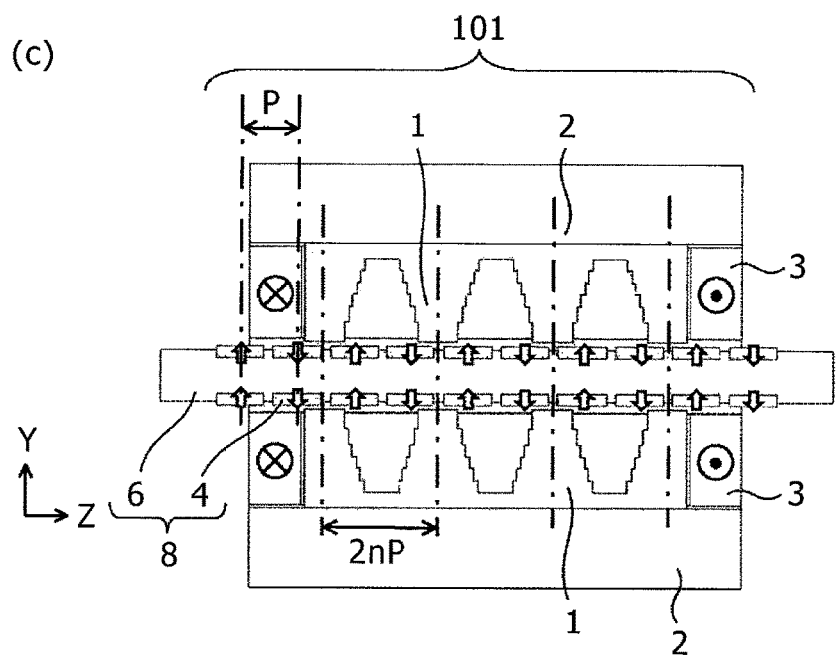

F I G . 3
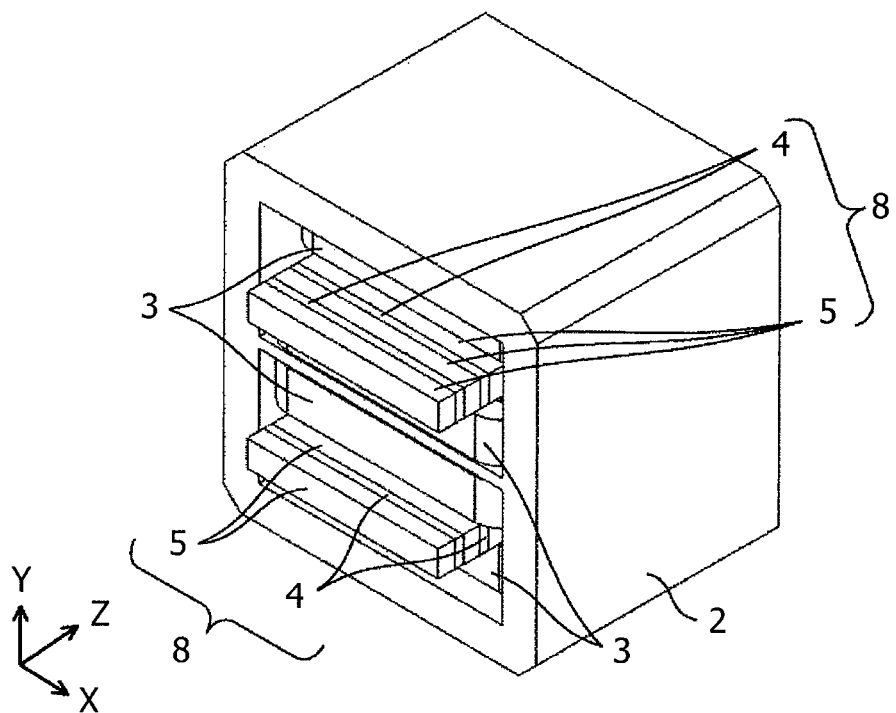

LINEAR MOTOR AND POSITIONING APPARATUS

TECHNICAL FIELD

The present invention relates to a linear motor and a positioning apparatus using it.

BACKGROUND ART

A conventional type linear motor has such structure that a rotating machine is cut open and great attraction acts between a mover including a row of magnets and an armature. Therefore, a great load is applied to a member that supports the mover and the ripple of force is caused at an end of the armature because of the discontinuity of a magnetic circuit.

Vibration and noise are caused by the ripple of force and a load onto a supporting part increases. Besides, a problem that the positioning accuracy of the linear motor is deteriorated because of the ripple of force also occurs.

Then, a method of reducing the ripple by providing an auxiliary magnetic pole at the end of the armature and diagonally arranging the auxiliary magnetic pole is taken as disclosed in a patent literature 1. According to this patent, as the ripple is offset by providing the auxiliary magnetic pole at both ends of the armature and diagonally arranging the auxiliary magnetic pole, the nonuniformity of thrust can be improved.

CITATION LIST

Patent Literature

Patent Literature 1: Japanese Unexamined Patent Application Publication No. 2008-125322

SUMMARY OF INVENTION

Technical Problem

The above-mentioned technique has the following problem. The amplitude of the ripple of force can be reduced by diagonally arranging the auxiliary magnetic pole. However, even if the adjustment of the ripple of force caused by an error in manufacture, the dispersion of characteristics and others is tried, the adjustment is difficult. Besides, when plural following ripples are included and the waveforms of the ripples in both auxiliary magnetic poles are different, it is difficult to adjust and reduce the ripples.

Further, the armature and others are deformed by the attraction of the armature and the magnet. As force that acts on the armature and the magnet increases by the action of current that flows in winding in driving, a problem that the ripple grows and the ripple varies depending upon a driving condition also occurs.

An object of the present invention is to provide a linear motor in which a load onto a supporting mechanism and the ripple of force are lessened and the ripple can be adjusted so as to settle the problems.

Solution to Problem

The linear motor according to the present invention is configured by plural magnetic poles arranged with the magnetic poles holding a magnet arranged on a mover between, a core that continuously connects the magnetic poles which hold the magnet of the mover between, winding integrally wound onto the plural magnetic poles and the mover formed by a row of magnets the magnetic poles of which are alternately arranged or a row of magnets the polarity of which is alternately arranged and magnetic materials. Besides, the plural magnetic poles arranged with the magnet held between the magnetic poles and the plural magnetic poles provided with the core that continuously connects the magnetic poles which hold the magnet are arranged in a longitudinal direction of the mover and the winding common to the plural magnetic poles is arranged.

As a leakage flux between the magnetic poles can be reduced by making the polarity of the plural magnetic poles the same, the miniaturization and the lightening of the linear motor are enabled.

Further, the effect of an end is reduced by shifting positions of the magnetic poles that hold the magnet and the ripple of force and a load onto a supporting mechanism can be reduced. Furthermore, the double movers or more movers are provided in a direction perpendicular to a traveling direction of the mover and as a result, the ripple of force and attraction to be a load onto the supporting mechanism can be offset.

Besides, the linear motor according to the present invention may be also provided with a mover configured by magnets or magnets and a magnet holder, plural magnetic poles arranged with the mover held between them, a core that connects the plural magnetic poles and winding arranged on the plural magnetic poles.

In addition, the linear motor according to the present invention has structure that the mover pierces a stator configured by the magnetic poles and the core that connects the magnetic poles, space pierced in a direction in which the mover is moved is provided to a magnetic circuit, and an opening is provided to the magnetic circuit configured by the magnetic poles and the core that connects the magnetic poles.

Further, in the linear motor according to the present invention, the stator configured by the magnetic poles, the core that connects the magnetic poles and the winding is fixed and the mover configured by the magnets and the magnet holder is moved. Or the mover is fixed and the stator is moved.

Advantageous Effects of Invention

For the effects of the present invention, a load onto a supporting mechanism of a mover is reduced by offsetting attraction that acts on the mover and the moment. Besides, the adjustment of a ripple is facilitated by shifting the core on the upside and on the downside of the mover. The small-sized and light linear motor where a leakage flux can be reduced because the plural magnetic poles have the same polarity can be configured by the effects of the present invention. Further, the linear motor where a ripple can be easily adjusted and a load onto the supporting mechanism of the mover is reduced can be provided.

BRIEF DESCRIPTION OF DRAWINGS

FIGS. 2 are schematic diagrams showing a driving unit in a modified example of the first embodiment of the present invention, FIG. 2A is a front view, FIG. 2B is a schematic perspective view, and FIG. 2C is a schematic side view;

FIG. 3 shows a driving unit equivalent to a second embodiment of the present invention;

DESCRIPTION OF EMBODIMENTS

Embodiments of the present invention will be described below.

First Embodiment

Figure 1:
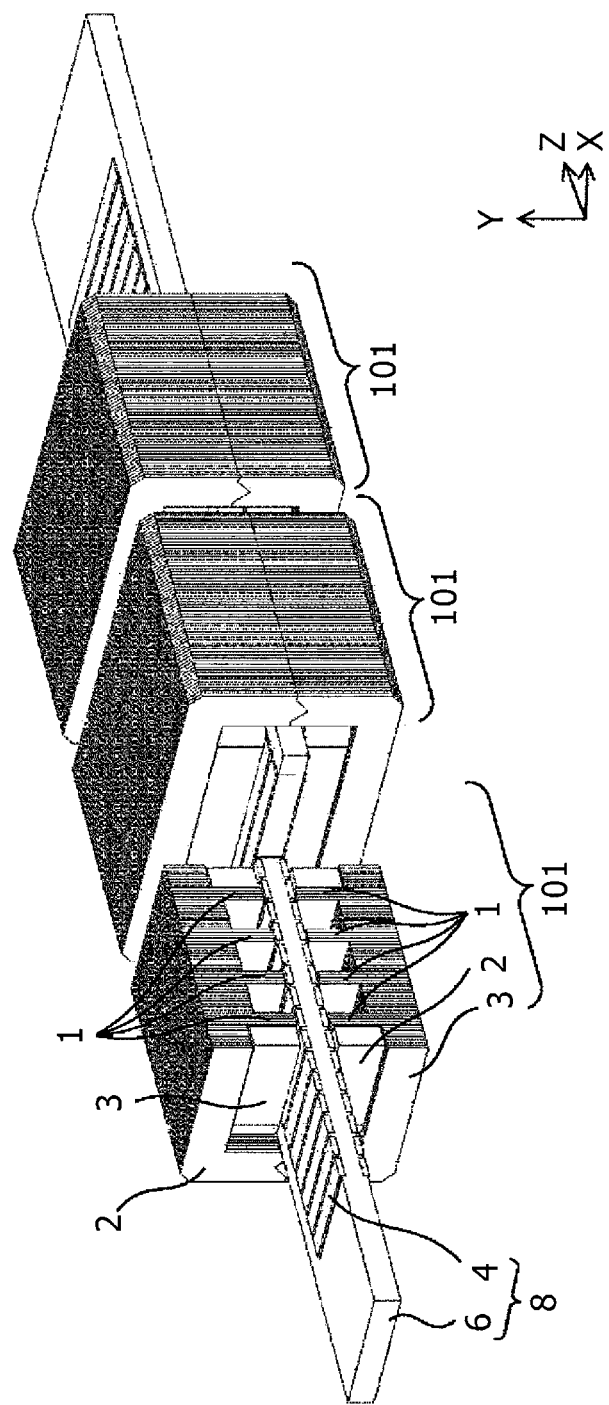
FIG. 1 is a schematic representative diagram showing a linear motor equivalent to a first embodiment of the present invention.

A first embodiment of the present invention will be described below. FIG. 1 is a schematic diagram showing the first embodiment. FIG. 1 shows a three-phase linear motor according to the present invention. A driving unit 101 on this side in the linear motor configured by three driving units 101 shown in the schematic diagram in FIG. 1 is cut on a Y-Z plane so as to disclose the inside.

The linear motor according to the present invention is formed by a stator configured by a magnetic pole 1, a core 2 that connects plural magnetic poles and a winding 3 wound onto the plural magnetic poles and a mover 8 configured by a magnet 4 and a magnet holder 6. The core 2 that connects the magnetic poles is vertically divided.

The core that connects divided magnetic poles is divided so that an upper member and a lower member have the same shape so as to form with the same members, however, a divided position is not limited to a position in which the upper and lower members have the same shape.

Besides, the core that connects the upper and lower magnetic poles is provided with a triangular notch in a part in which the upper and lower members are connected so as to facilitate alignment, however, the present invention is not limited to this shape.

The upper and lower magnetic poles and the core that connects the magnetic poles can be relatively shifted by vertically dividing the core that connects the magnetic poles. The ripple of force generated in the mover 8 can be reduced by shifting the upper and lower magnetic poles and the core that connects the magnetic poles. Besides, the adjustment of force that acts on the mover is enabled by adjusting the shift.

The mover 8 is inserted with the mover piercing the magnetic pole 1 and the core 2 that connects the magnetic poles. The magnetic pole 1 is configured by respective upper and lower four poles with the mover 8 configured by the magnet holder 6 and the plural magnets 4 held between. The number of the magnetic pole 1 is not limited to four.

The magnetic pole 1 and the core 2 that connects the magnetic poles are formed by a laminated member. As a shifted and overhanged part is removed and can be installed on the reverse side to a shifted direction by forming by the laminated member when the upper and lower magnetic poles 1 and the core 2 that connects the magnetic poles are shifted, effect that adjustment is enabled without greatly changing a shape is acquired.

The driving unit 101 is laterally symmetrical when it is viewed on an X-Y plane and for example, configures a magnetic circuit in which a magnetic flux from the magnet 4 passes the upper magnetic pole 1 and returns the magnet 4 through the lower magnetic pole 1 via the core 2 that connects the magnetic poles.

As described above, the magnetic circuit can be shortened by arranging the core 2 that connects the magnetic poles with the core enclosing the mover 8 and the strength of the driving unit 101 can be also increased. The core that connects the magnetic poles is not required to be laterally symmetrical.

FIGS. 2 show an example in which the shape of the magnetic pole 1 of the linear motor shown in FIG. 1 is tapered toward the magnet 4. FIG. 2A is a front view showing the driving unit 101. FIG. 2B is a schematic perspective view showing the driving unit 101 cut on the Y-Z plane. FIG. 2C is a schematic side view showing the driving unit cut on the Y-Z plane.

As shown in FIG. 2A, the winding 3 is arranged opposite to the magnet 4 and the mover configured by the magnet 4 and the magnet holder 6 is enclosed by the core 2 that connects the magnetic poles. FIG. 2B shows the example in which the magnetic pole 1 is tapered toward the magnet 4.

In FIG. 2B, the magnetic pole 1 is tapered toward the magnet 4; however, the present invention is not limited to this shape.

As shown in FIG. 2C, the magnet 4 is arranged with the magnet holder 6 held between magnets the direction of magnetization of which is the same and magnets magnetized in reverse directions are alternately arranged in a direction shown by an arrow Z. An arrow of the magnet 4 shows a direction of magnetization of the magnet.

Besides, pitch of the magnetic pole 1 is substantially double, compared with pitch of the magnet arranged in the direction shown by the arrow Z. As shown in FIG. 2C, the magnets and the magnetic poles are arranged so that the pitch of the magnetic pole 1 is substantially 2nP (n=1, 2, 3, . . . ), compared with pitch P in the direction shown by the arrow Z of the magnet.

In this embodiment, the magnet holder 6 is formed by magnetic materials; however, the magnet holder may be also formed by non-magnetic materials. Besides, as for the magnet 4 arranged with the magnet holder 6 held between, magnets arranged in a direction shown by an arrow Y are integrated and the magnet may be also embedded in a ladder-type magnet holder.

In addition, force in the direction shown by the arrow Z acts on the mover 8 by making current flow in the winding 3 according to a position of the magnet 4 in FIG. 2C.

The plural driving units 101 are arranged, the plural driving units are out of phase with the magnet, and the mover can be also continuously moved by making different alternating current flow every driving unit.

As described above, a multi-phase linear motor can be also formed by the plural driving units. FIGS. 2 show a state in which the centers of the upper and lower magnetic poles 1 arranged with the mover 8 held between them substantially coincide and are not shifted in the direction shown by the arrow Z.

In this state, force in the direction shown by the arrow Y that acts on the mover 8 is vertically offset and can be reduced. Besides, when the ripple of force is caused because of dispersion in the precision of assembly and characteristics of the magnet, the upper and lower magnetic poles 1 are shifted and the ripple of force can be also adjusted.

As described above, in the linear motor according to the present invention, force that acts on the mover is reduced by adjusting positions of the upper and lower magnetic poles according to a purpose.

Second Embodiment

Figure 4:
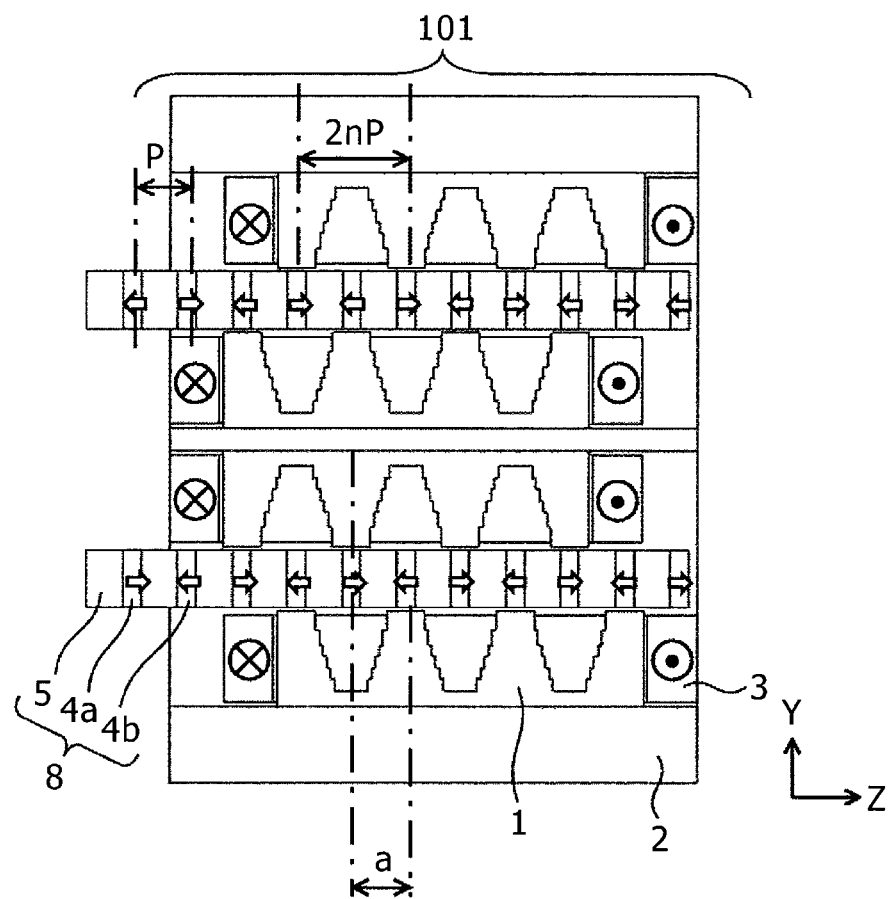
FIG. 4 is a schematic diagram showing the driving unit equivalent to the second embodiment of the present invention and cut on a Y-Z plane.

FIG. 3 is a schematic diagram showing a linear motor according to a second embodiment of the present invention. FIG. 4 shows the linear motor shown in FIG. 3 and cut on a Y-Z plane. As shown in FIG. 3, a mover 8 is configured by a magnet 4 and a pole piece 5 made of magnetic substances and the double movers 8 are provided.

An arrow in FIG. 4 shows a direction of magnetization of the magnet. As for the magnet, a magnet 4a magnetized in a direction shown by an arrow Z (a +Z direction) and a magnet 4b magnetized in a direction reverse to the direction shown by the arrow Z (a −Z direction) are alternately arranged in pitch P of the magnet and the pole piece 5 made of magnetic substances is arranged between the magnets.

A stator configured by a magnetic pole 1, a core 2 that connects magnetic poles and a winding 3 wound on the plural magnetic poles is arranged opposite to each mover 8 double provided. Pitch of the magnetic pole 1 on one side for the mover 8 is substantially 2nP (n=1, 2, 3, . . . ) (in FIG. 4, n=1).

Besides, the upper and lower magnetic poles 1 opposite to each mover 8 are shifted by distance "a" substantially similar to the pitch P of the magnet on the upside and on the downside of the mover. Attraction and the moment that respectively act on the mover 8 can be offset by symmetrically arranging upper and lower linear motors as shown in FIG. 4 and mechanically coupling the upper and lower movers 8.

Further, a part of the cores that connect the magnetic poles of the upper linear motor and the lower linear motor can be shared and the linear motor can be also miniaturized.

Force acts in the direction shown by the arrow Z of the upper and lower movers by making current flow in the winding 3 shown in FIG. 4.

Figure 5:
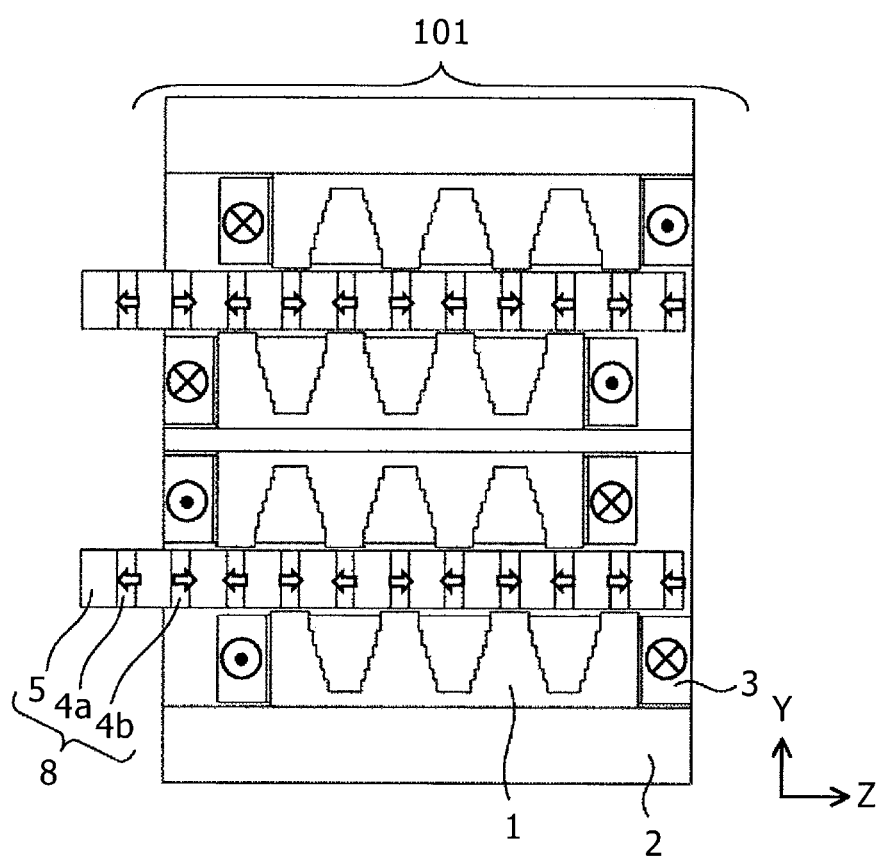
FIG. 5 is a schematic diagram showing a driving unit in a modified example 1 of the second embodiment of the present invention.

FIG. 5 shows a direction of current when the upper and lower movers are arranged so that a direction of magnetization of them is the same.

Figure 6:
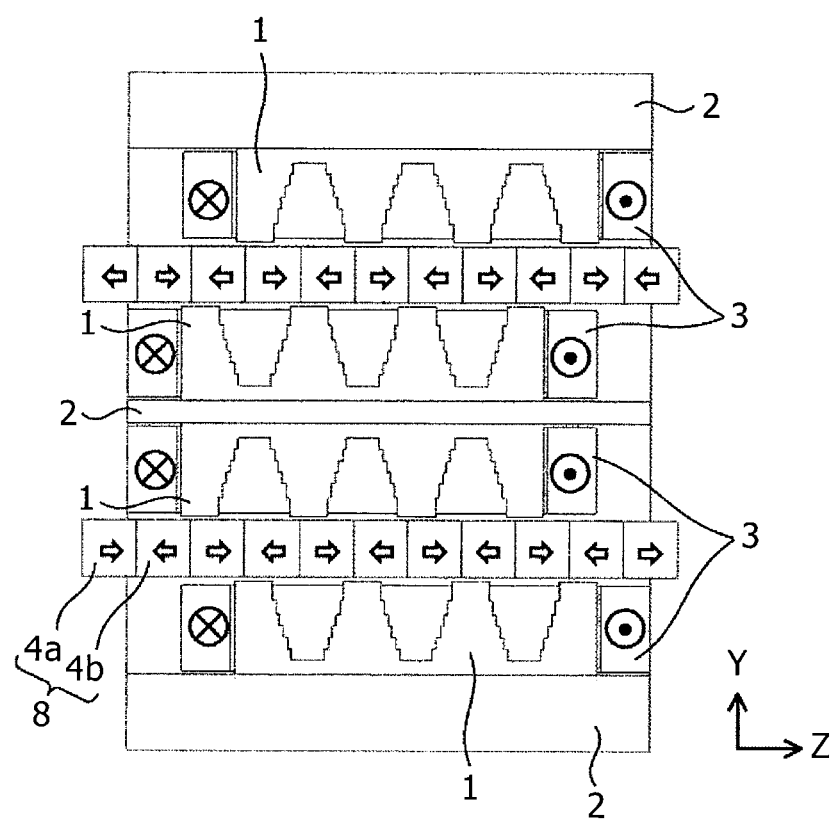
FIG. 6 is a schematic diagram showing a driving unit in a modified example 2 of the second embodiment of the present invention.

FIG. 6 shows an example in which the mover is configured by the magnet 4a and the magnet 4b. As shown in FIG. 6, the mover 8 can be configured even if the magnet 4a and the magnet 4b are alternately connected.

FIGS. 4, 5 and 6 show the examples in which positions of the magnetic poles opposite to the mover are shifted substantially by the pitch of the magnet on the upside and on the downside of the mover, however, the shift of the magnetic poles on the upside and on the downside of the mover is not required to be substantially similar to the pitch of the magnet. Attraction and the moment that act on the upper and lower movers of the linear motor can be offset by adjusting the shift of the upper and lower magnetic poles shifted substantially by the pitch of the magnet.

Figure 7:
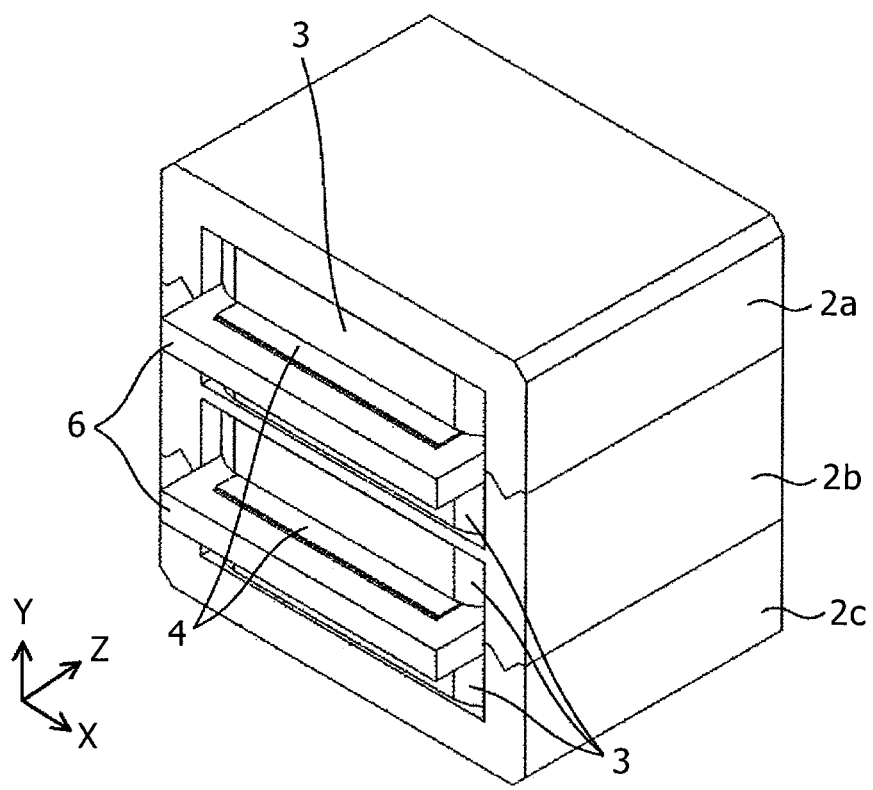
FIG. 7 shows an example in which a core that connects magnetic poles is divided.

FIG. 7 shows an example in which the core that connects the magnetic poles of the two-stage linear motor is divided in three. As shown in FIG. 7, the core that connects the magnetic poles is divided into an upper divided core 2a, a lower divided core 2c and a central divided core 2b, and the upper divided core 2a and the lower divided core 2c have the same shape.

Figure 8:
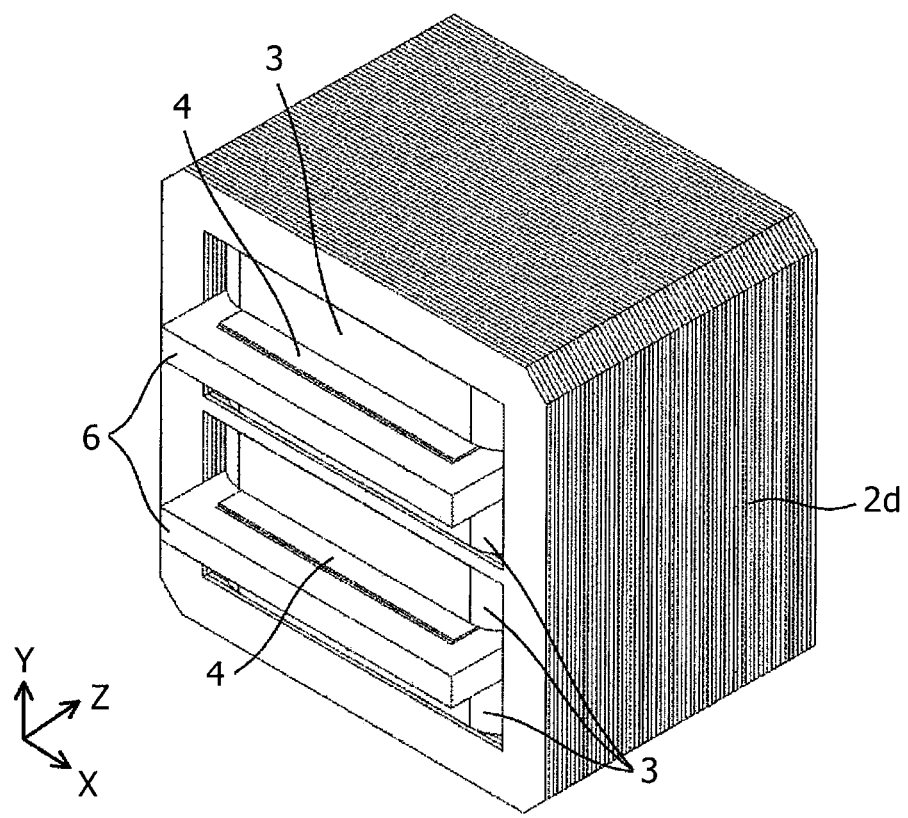
FIG. 8 shows an example in which a laminated member is used.

FIG. 8 shows an example in which the linear motor is formed using a laminated core 2d.

Figure 9:
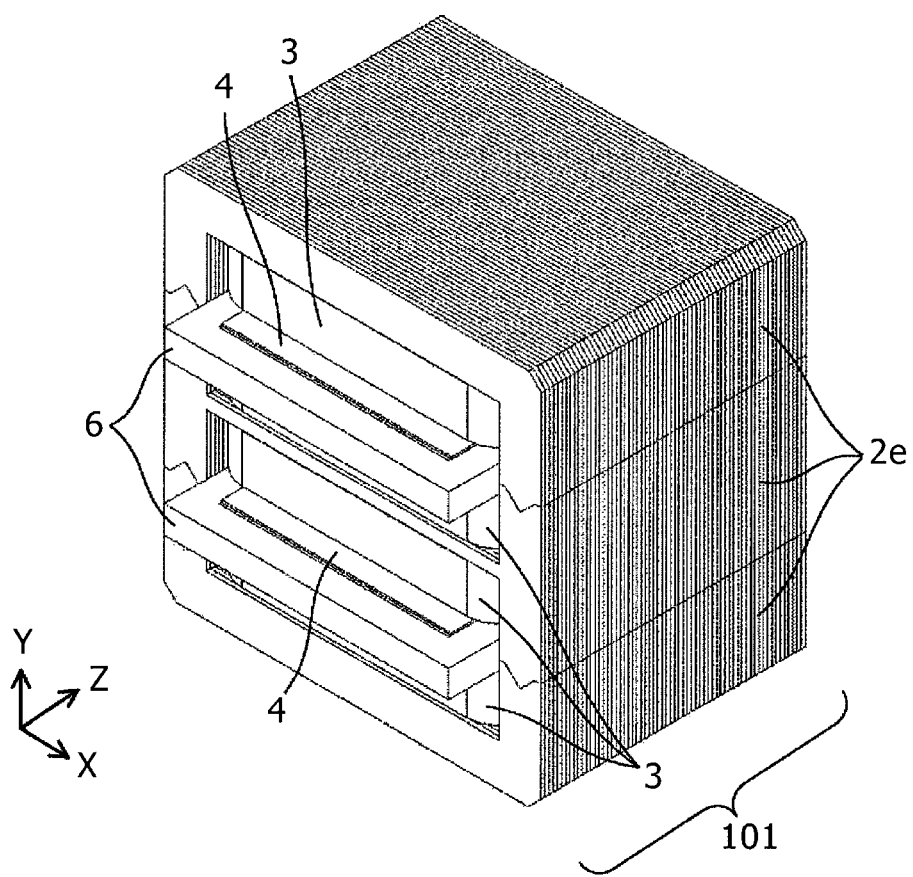
FIG. 9 shows an example in which a laminated member is used and is divided.

FIG. 9 shows an example in which the linear motor is formed by laminated divided cores 2e.

Figure 10:
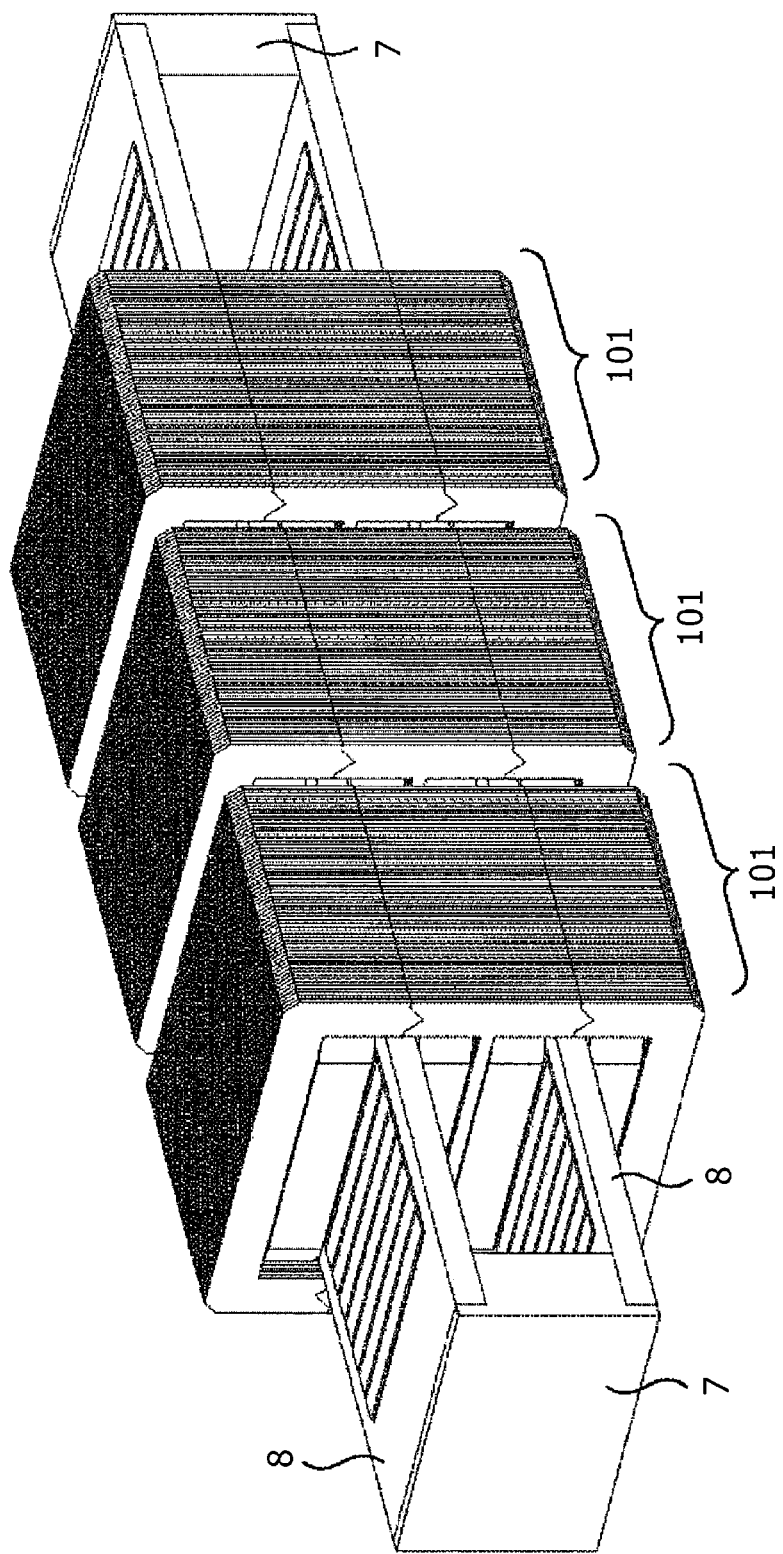
FIG. 10 shows an example in which movers are coupled.

FIG. 10 shows an example in which the three-phase linear motor is configured by arranging the driving unit 101 shown in FIG. 4 by three pieces. Each driving unit 101 is arranged so that each phase is electrically shifted by 120° for a row of magnets.

Besides, ends of the movers are coupled by a coupling member 7. The effect of the moment and attraction that act on upper and lower each mover can be reduced by coupling the upper and lower movers as described above. In addition, the rigidity of the mover can be also enhanced.

Figure 11:
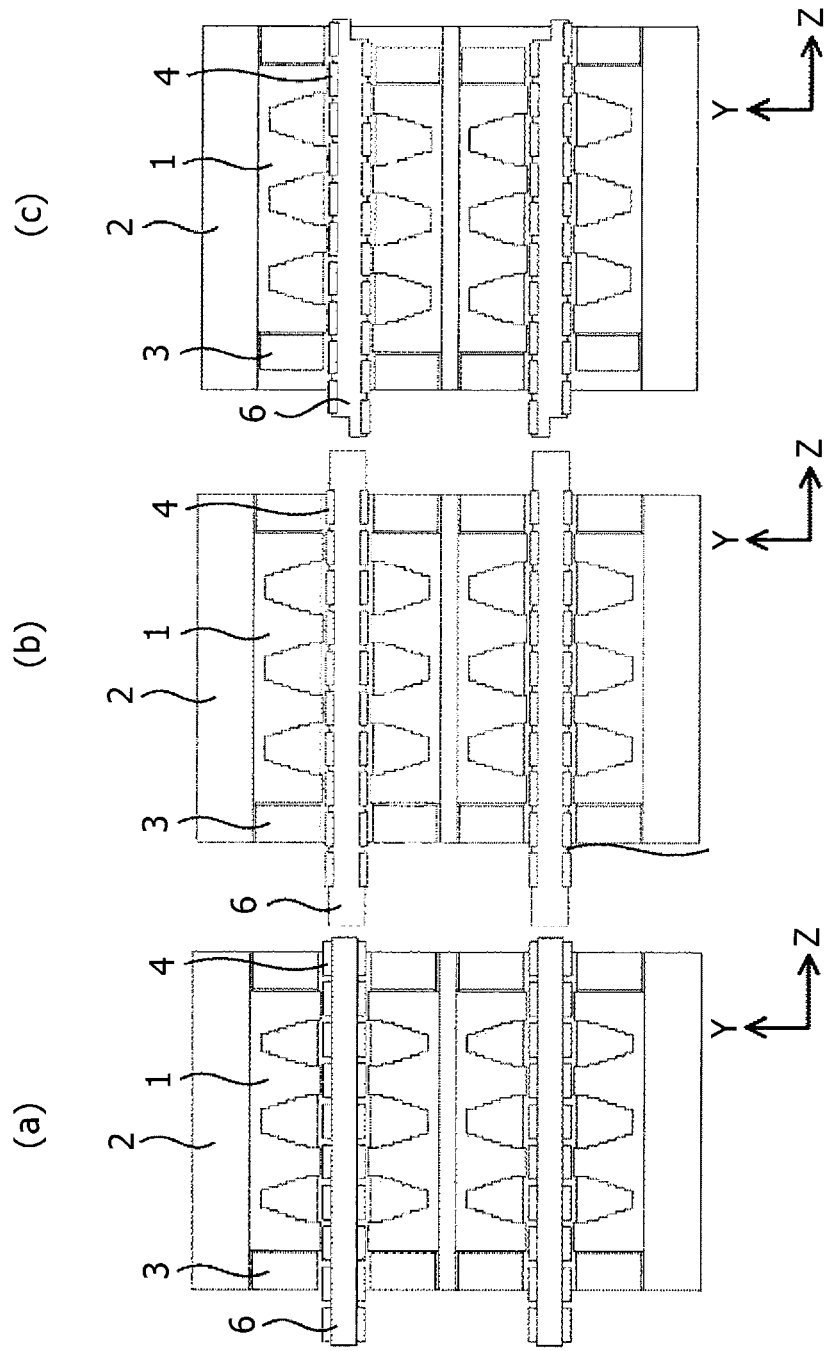
FIGS. 11 are sectional views showing examples of the configuration of the driving unit.

FIGS. 11A, 11B and 11C show the configuration of the linear motor according to the present invention. Each drawing of FIGS. 11 shows the linear motor cut on the Y-Z section so as to disclose the arrangement of the magnetic pole and the magnet.

FIG. 11A shows structure in which the magnets 4 are mounted on the flat magnet holder 6. This configuration has a characteristic that as this configuration is the structure that the magnets are mounted on a flat plate made of iron and others, the productivity is satisfactory.

As shown in FIG. 11B, a groove for arranging the magnets is worked in the magnet holder 6 and a projection 9 exists between the magnets arranged in a direction shown by an arrow Y. When the projection 9 is formed by magnetic materials, effect that a magnetic flux interlinked with the winding 3 is increased is acquired.

Besides, the magnet holder 6 and the projection 9 may be also integrated and may be also formed by separate members. When the projection 9 is provided, a concave portion of the magnet holder 6 can be also utilized for a groove for positioning the magnet 4.

FIG. 11C shows an embodiment in which as to the magnetic poles 1 that hold the mover between them and the core 2 that connects the magnetic poles, the cores on the upside and on the downside of the mover are shifted and besides, positions of the magnets of the mover are shifted on the surface and at the back of the magnet holder 6. As described above, the positions of the magnets can be also shifted on the surface and at the back of the mover.

Figure 12:
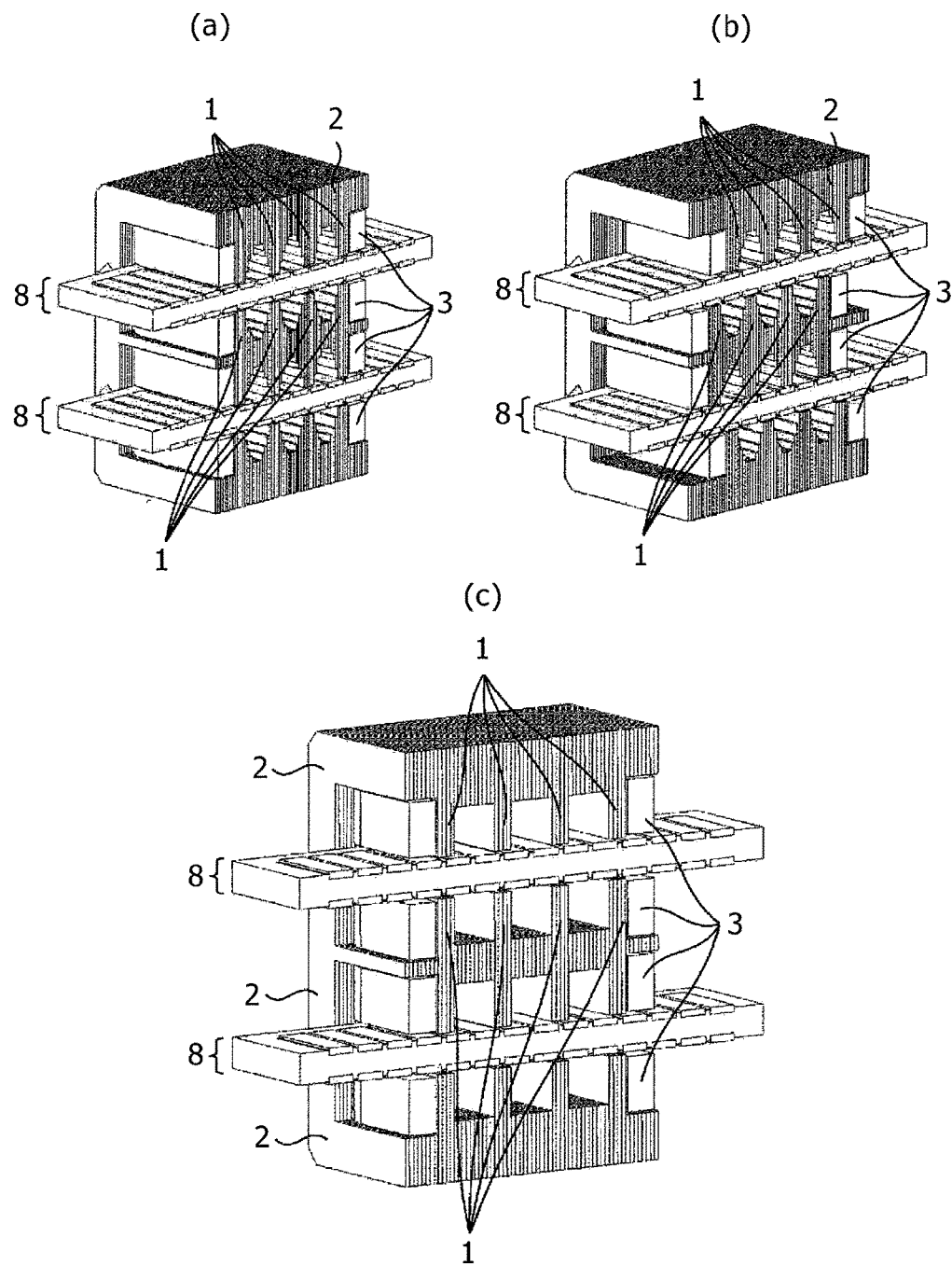
FIGS. 12 show transformed examples of the magnetic pole or/and the core that connects the magnetic poles.

FIGS. 12 show the linear motor partially cut so as to disclose the configuration of the magnetic pole 1 and the core 2 that connects the magnetic poles. FIGS. 12 show an example in which the magnetic pole 1 and the core 2 that connects the magnetic poles of the linear motor according to the present invention are formed by superimposing laminated steel plates.

In FIG. 12A, the magnetic poles 1 on the upside and on the downside of the mover 8 are aligned in a traveling direction of the mover 8. FIG. 12B shows an example in which the magnetic poles 1 on the upside and on the downside of the mover 8 are shifted in the traveling direction of the mover. FIG. 12C shows an example in which the magnetic pole 1 is formed in a rectangle.

Figure 13:
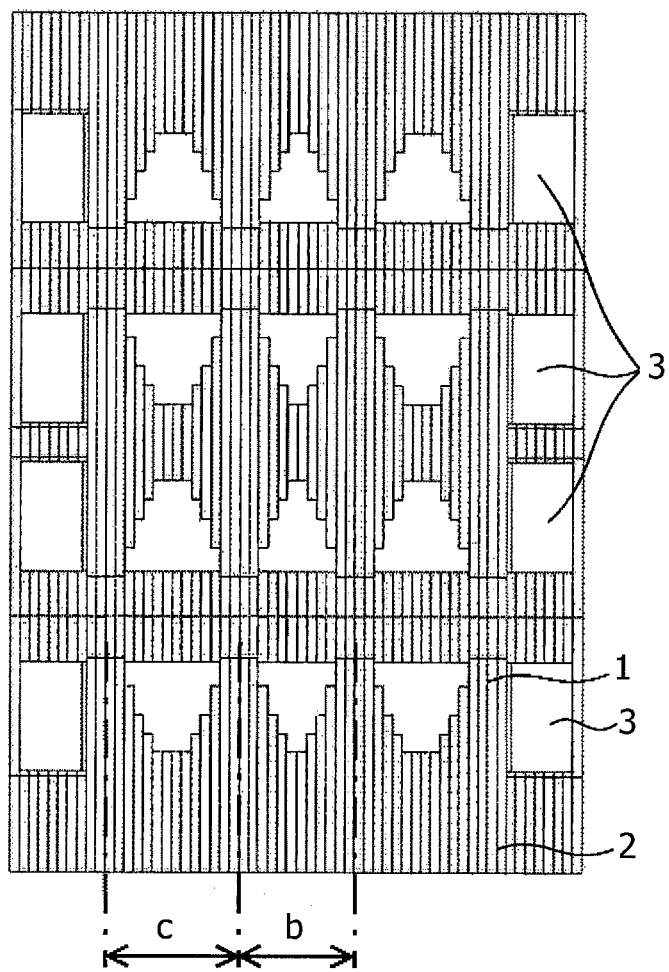
FIG. 13 shows an example in which the number of laminated steel plates is changed.

FIG. 13 shows an example in which the linear motor is formed by laminated steel plates. The linear motor cut in the traveling direction of the mover is shown so as to disclose the inside of the linear motor. FIG. 13 shows only the stator configured by the magnetic pole 1, the core 2 that connects the magnetic poles and the winding 3.

The pitch of the magnetic pole 1 can be arbitrarily adjusted with the adjustment of the number of the laminated steel plates by forming the magnetic pole 1 and the core 2 that connects the magnetic poles by laminated steel plates. The position of the magnetic pole 1 can be adjusted like the pitch "b" of the magnetic pole and the pitch "c" of the magnetic pole by changing the number of the laminated steel plates. The pitch b of the magnetic pole is formed by twelve laminated steel plates and the pitch c of the magnetic pole is formed by fourteen laminated steel plates.

Third Embodiment

Figure 14:
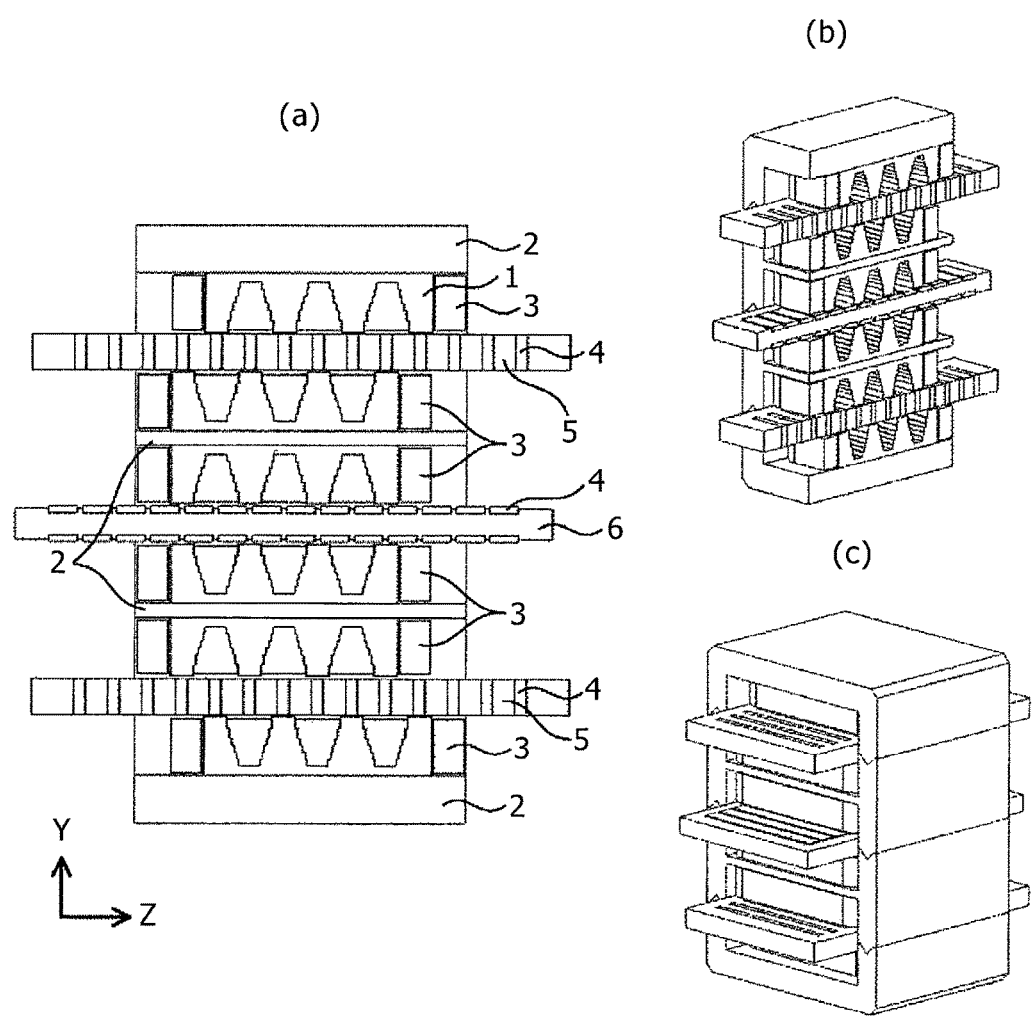
FIGS. 14 are schematic diagrams showing a third embodiment of the present invention.

FIGS. 14 show a third embodiment of the present invention.

FIGS. 14 show the embodiment in which the linear motor shown in FIG. 2 is combined in an intermediate part of the linear motor shown in FIG. 4. FIG. 14A shows the linear motor cut on a Y-Z plane. FIG. 14B is a perspective view showing the linear motor shown in FIG. 14A.

Besides, FIG. 14C is a perspective view showing the linear motor. As directions of the generated moments are mutually reverse in the uppermost linear motor shown in FIGS. 14 and the lowermost linear motor, the moments are offset and can be reduced.

In addition, in the linear motor in the center, magnetic poles on the upside and on the downside of a mover are symmetrical and the moment that acts on the mover in the center is small. The moments and attraction in a direction shown by an arrow Y can be mutually reduced by coupling these three movers.

In this embodiment, the structure having the triple movers has been described; however, arranging movers so as to reduce the moment and attraction enables multiple configuration in which further more movers are provided.

Further, as directions of magnetic fluxes are reverse in a core that connects magnetic poles in the uppermost, the central and the lowermost linear motors respectively shown in FIGS. 14 and magnetic saturation is relaxed, the core can be thinned and as a result, the whole linear motor is also miniaturized.

Figure 15:
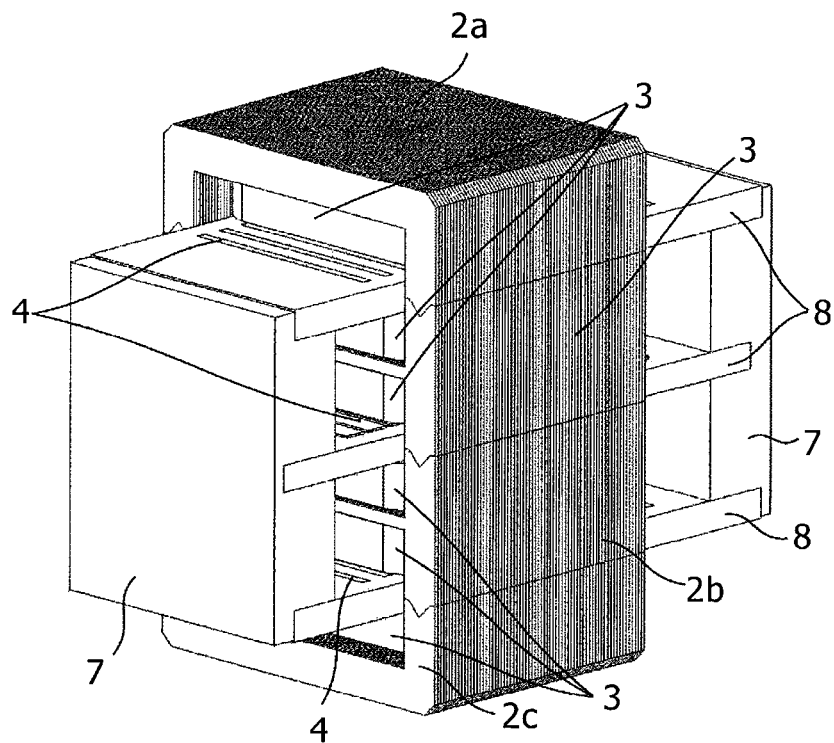
FIG. 15 shows an example in which movers in the third embodiment of the present invention are coupled.
Figure 16:
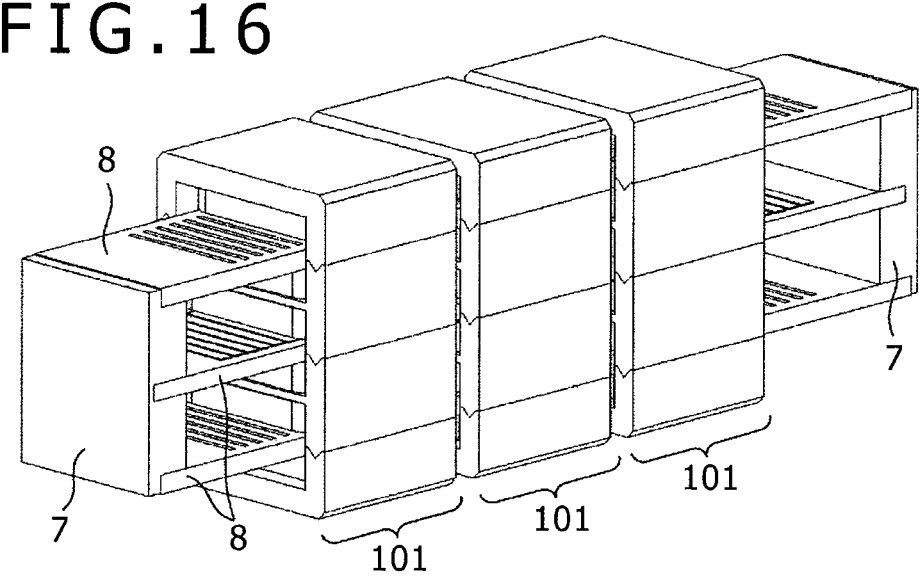
FIG. 16 shows the configuration of a three-phase linear motor.

FIG. 15 shows a linear motor acquired by mechanically fastening individual movers 8 in the linear motor shown in FIGS. 14. The individual movers 8 may be also coupled as described above. FIG. 16 shows a three-phase linear motor acquired by arranging three linear motors one of which is shown in FIG. 15.

Fourth Embodiment

Figure 17:
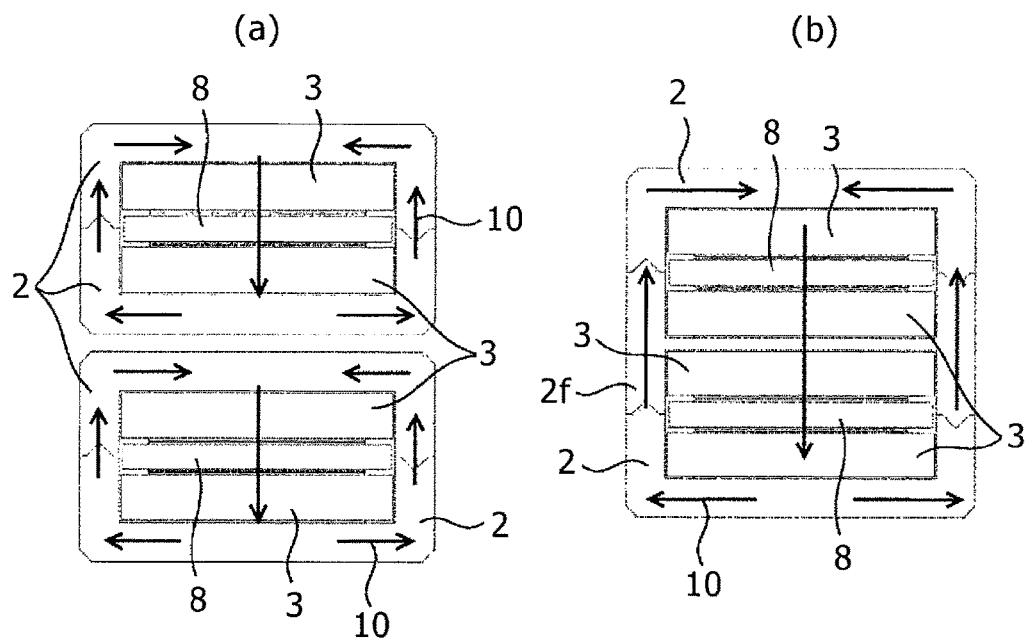
FIGS. 17 show examples of magnetic fluxes of the linear motor.

FIGS. 17 are front views showing a two-stage linear motor and schematically show a magnetic flux 10 generated by a magnet. FIG. 17A is the front view showing upper and lower individual linear motors. FIG. 17B shows directions of magnetic fluxes 10 when the two linear motors are united.

The miniaturization of the linear motor is enabled by sharing a core 2 that connects a lower magnetic pole in the upper linear motor and a core 2 that connects an upper magnetic pole in the lower linear motor in the two linear motors shown in FIG. 17A to be a core 2f that connects magnetic poles shown in FIG. 17B.

Fifth Embodiment

Figure 18:
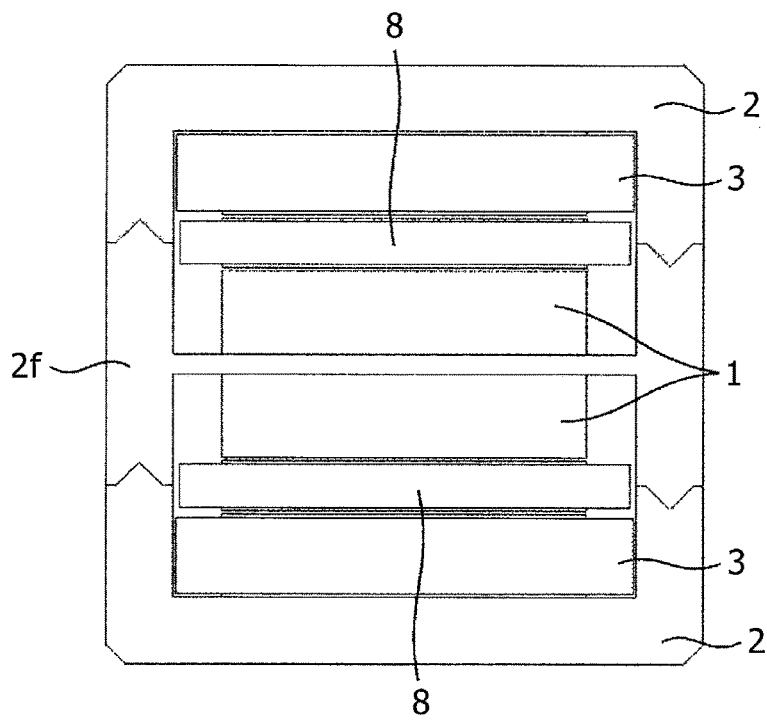
FIG. 18 shows an example of the arrangement of winding.

FIG. 18 shows a linear motor in which double movers 8 are built. FIG. 18 shows an example in which winding 3 is arranged on the upside of the upper mover 8 and on the downside of the lower mover 8. A position and the number of the winding 3 are not limited to them described in this embodiment.

Sixth Embodiment

Figure 19:
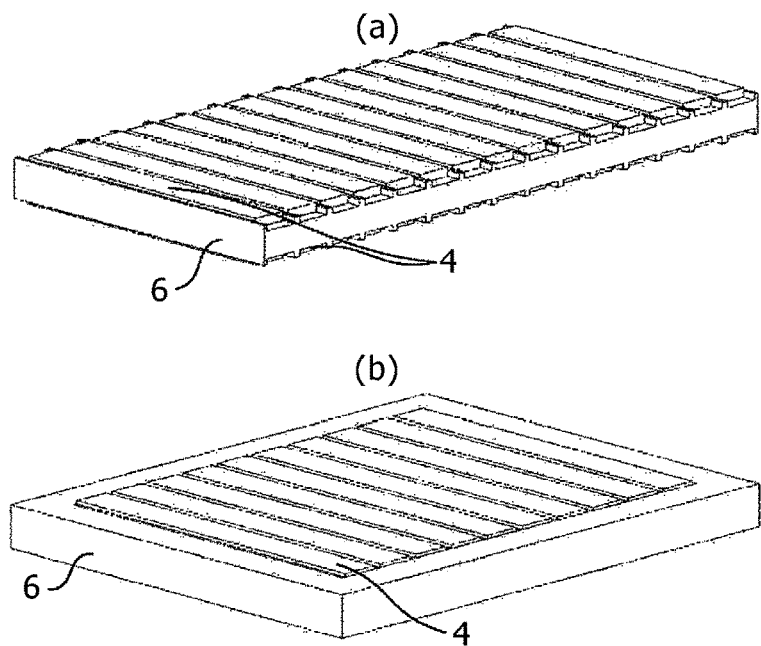
FIGS. 19 show an example 1 of the configuration of the mover.
Figure 20:
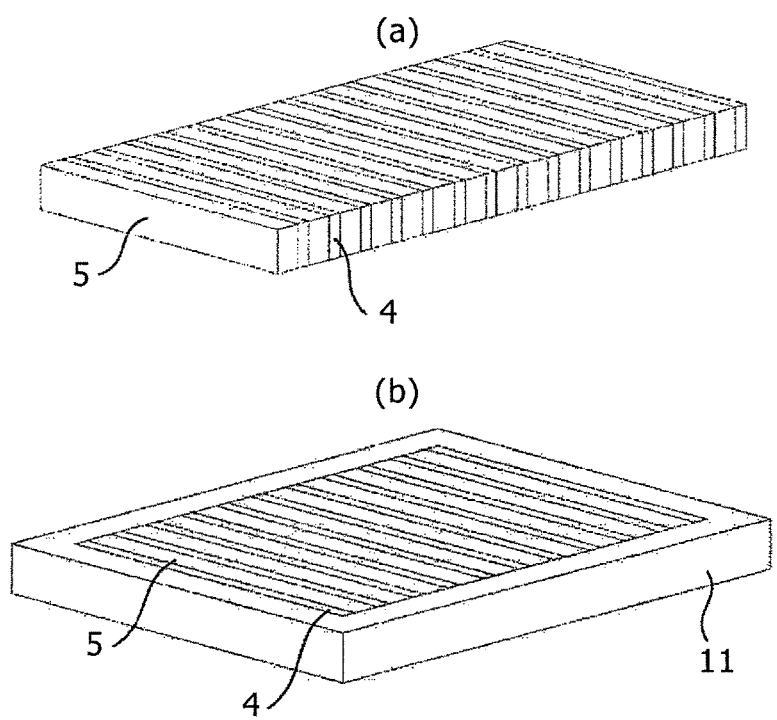
FIGS. 20 show an example 2 of the configuration of the mover.

FIGS. 19 and 20 show an embodiment of the mover in the present invention. FIG. 19A shows an example in which a groove is formed in a flat magnetic holder 6 and a magnet 4 is bonded. FIG. 19B shows an example in which a concave portion is provided to the magnet holder 6 and the magnet 4 is arranged.

FIG. 20A shows an example in which the mover is configured by only the magnet 4 and a pole piece 5. FIG. 20B shows an embodiment in which the mover shown in FIG. 20A is enclosed by a frame 11 so as to increase the strength. The frame 11 can be formed by magnetic materials and non-magnetic materials.

Seventh Embodiment

Figure 21:
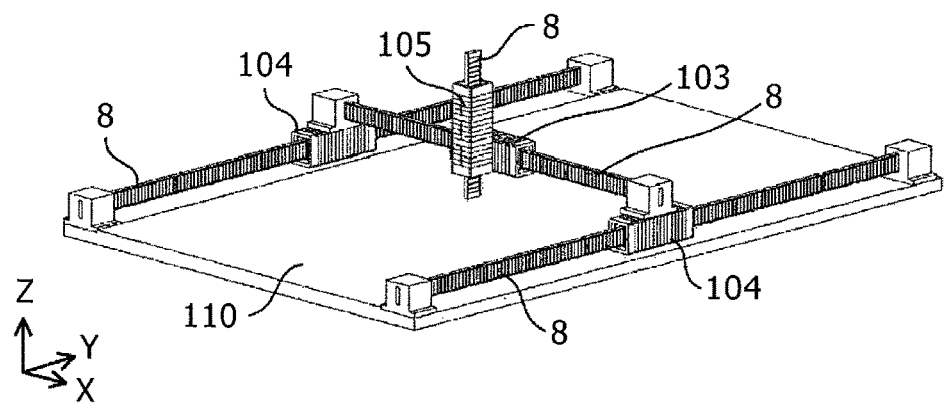
FIG. 21 shows an example of the configuration of a stage on which the linear motor according to the present invention is arranged.

FIG. 21 is a schematic diagram showing an embodiment of the present invention. Two y-axis linear motors 104 are installed on a stage 110 and an x-axis linear motor 103 is arranged on the two y-axis linear motors 104. A z-axis linear motor 105 is attached to the x-axis linear motor 103.

The miniaturization and the lightening of the linear motor are enabled by using the linear motor according to the present invention, inertia force when the linear motors of each axis are moved can be reduced, a load onto a supporting mechanism that supports the linear motors of each axis is reduced, and the enhancement of positioning accuracy and the reduction of response time are enabled.

Figure 22:
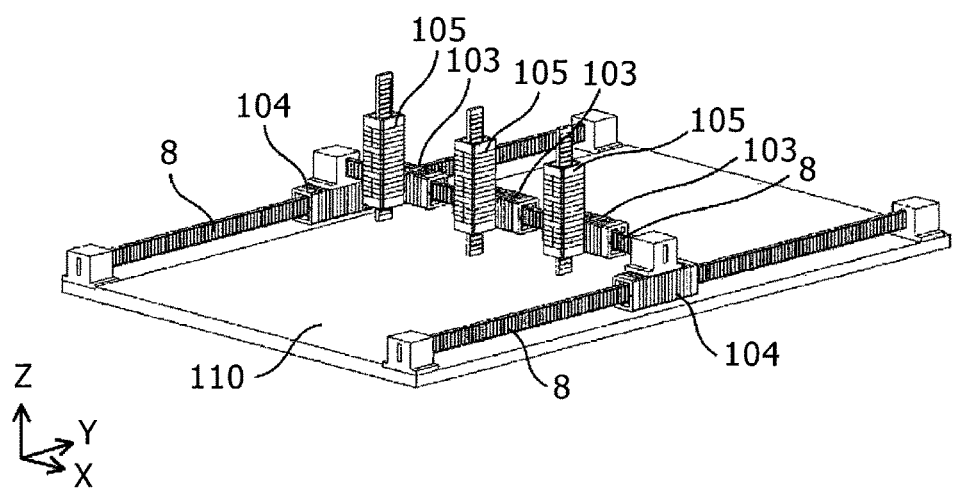
FIG. 22 shows an example 2 of the configuration of the stage.
Figure 23:
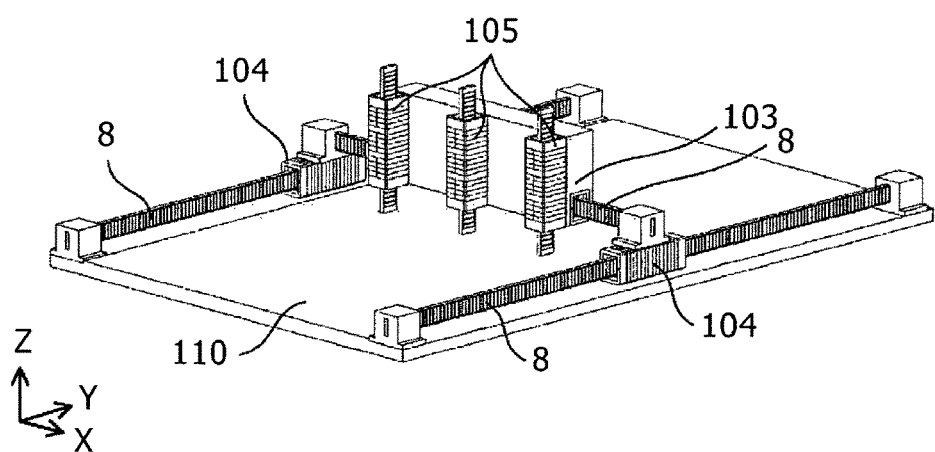
FIG. 23 shows an example 3 of the configuration of the stage.

FIG. 22 shows an example in which three x-axis linear motors 103 are arranged on the x-axis. FIG. 23 shows an example in which three z-axis linear motors 105 are arranged on one x-axis linear motor 103. As the weight of each axis can be also reduced by using the linear motor according to the present invention in a case of multiaxial configuration and a load by inertia onto the supporting mechanism and the deterioration of responsibility can be prevented, the enhancement of productivity can be expected by arranging the linear motors on multiple axes.

As a light mover can be manufactured in the linear motor according to the present invention, an effect by gravity can be reduced when the linear motor is arranged on the z-axis and the positioning accuracy of the z-axis can be enhanced.

In the embodiment of the present invention, the examples of positioning apparatuses using the linear motors of plural axes are described; however, the present invention is not limited to the described axes.

In the embodiments of the present invention, the examples when the shapes of the magnetic pole, the core that connects the magnetic poles and the mover are changed are described, however, if the similar effects are acquired, the present invention is not limited to the shapes.

Members of high magnetic ratio, for example iron material such as SS400 and S45C or silicon steel plates, can be utilized for the magnetic materials in this embodiment.

The movers described in the embodiments of the present invention are supported by a thrust bearing, an LM guide, a roller and others and a void between the magnetic pole and the mover can be held.

The magnetic pole and the core that connects the magnetic poles according to the present invention may be also integrated.

LIST OF REFERENCE SIGNS

1 Magnetic pole
2 Core that connects magnetic poles
2a Upper divided core
2b Central divided core
2c Lower divided core
2d Laminated core
2e Laminated divided core
3 Winding
4 Magnet
4a Right-oriented magnet
4b Left-oriented magnet
5 Pole piece
6 Magnet holder
7 Coupling member
8 Mover
9 Projection
10 Magnetic flux
11 Frame
101 Driving unit
102 Linear motor
103 X-axis linear motor
104 Y-axis linear motor
105 Z-axis linear motor
110 Stage

The invention claimed is:

1. A linear motor, comprising:
a mover in which magnets are arranged, a polarity of the magnets alternating on one side of a magnetic body;
a plurality of magnetic poles that are arranged in such a way that the mover is held between the magnetic poles;
a winding that is wound onto at least one of the plurality of magnetic poles;
a core that connects the plurality of magnetic poles; and
a driving unit configured by the plurality of magnetic poles and the core that connects the magnetic poles, wherein
a polarity of the plurality of magnetic poles that are adjacent to one another along a moving direction of the mover is the same,
the linear motor is structurally configured to constitute a magnetic circuit in which a magnetic flux that is emitted from one of the magnets passes through an upper magnetic pole and returns to the one of the magnets through a lower magnetic pole via the core which connects the plurality of magnetic poles,
the core that connects the plurality of magnetic poles encloses the mover, and
the plurality of magnetic poles arranged with the mover held between the magnetic poles are shifted in the traveling direction of the mover.

2. The linear motor according to claim 1, wherein:
the pitch of the magnetic pole is substantially 2nP (n=1, 2, 3, . . .) when pitch of the magnet in a traveling direction of the mover is P.

3. The linear motor according to claim 1, wherein:
the core is divided.

4. The linear motor according to claim 1, wherein:
the magnetic pole, the core that connects the magnetic poles and a member configured by them are formed by a member laminated in the traveling direction of the mover.

5. The linear motor according to claim 1, comprising:
a plane with respect to which the plurality of magnetic poles and a surface of the magnets are opposite, wherein:
the mover pierces a stator configured by the plurality of magnetic poles and the core that connects the plurality of magnetic poles.

6. The linear motor according to claim 1, comprising:
the mover where the magnets are arranged on the upside and on the downside of a flat magnetic body.

7. The linear motor according to claim 1, comprising:
two or more movers, wherein:
the two or more movers are arranged symmetrically with the axis in the traveling direction of the movers.

8. The linear motor according to claim 7, wherein:
the two or more movers are coupled.

9. A positioning apparatus, wherein the linear motor according to claim 1 is used.

10. A positioning apparatus, wherein:
the linear motor according to claim 1 is arranged along a longitudinal axis of the mover.

11. The linear motor according to claim 1, wherein magnet polarities on opposite surfaces of the mover that are immediately adjacent to the magnetic poles, at a same longitudinal location of the mover, are the same.

12. A linear motor, comprising:
a mover in which magnets are arranged, a polarity of immediately adjacent magnets alternating;
a plurality of magnetic poles that are arranged in such a way that the mover is held between the plurality of magnetic poles;
a winding that is wound onto at least one of the plurality of magnetic poles;
a core that connects the plurality of magnetic poles; and
a driving unit configured by the plurality of magnetic poles and the core that connects the plurality of magnetic poles, wherein:
a force that acts on the mover in directions except a traveling direction of the mover is offset,
a pitch of the magnetic pole is substantially 2nP (n=2, 3, . . .) when a pitch of the magnet in a traveling direction of the mover is P,
a polarity of the plurality of magnetic poles that are adjacent to one another along a moving direction of the mover is the same,
the linear motor is structurally configured to constitute a magnetic circuit in which a magnetic flux that is emitted from one of the magnets passes through an upper magnetic pole and returns to the one the magnets through a lower magnetic pole via the core which connects the plurality of magnetic poles,
the core that connects the plurality of magnetic poles encloses the mover, and
the plurality of magnetic poles arranged with the mover held between the magnetic poles are shifted in the traveling direction of the mover.

13. The linear motor according to claim 12, wherein magnet polarities on opposite surfaces of the mover that are immediately adjacent to the magnetic poles, at a same longitudinal location of the mover, are the same.

* * * * *